Nov. 3, 1931.   G. B. FRENCH ET AL   1,830,160
TELEPHONE RECEIVER
Filed March 19, 1928

INVENTORS
George B. French and
BY Jesse L. Spence
M. H. Lockwood
ATTORNEY

Patented Nov. 3, 1931

1,830,160

UNITED STATES PATENT OFFICE

GEORGE B. FRENCH, OF SOUTHAMPTON, AND JESSE L. SPENCE, OF BROOKLYN, NEW YORK, ASSIGNORS TO FRENCH ELECTRIC COMPANY, A CORPORATION OF NEW YORK

TELEPHONE RECEIVER

Application filed March 19, 1928. Serial No. 262,618.

Figure 1:
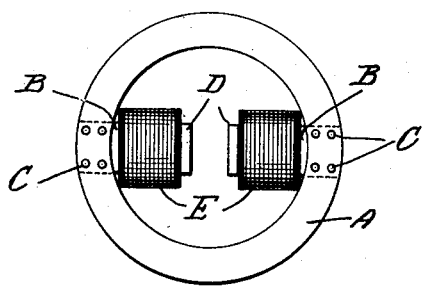
Figure 3:
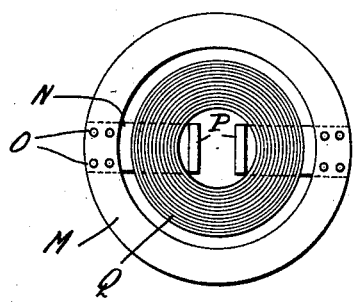
Figure 2:
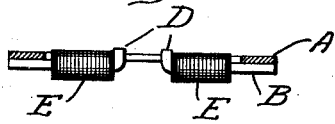
Figure 4:
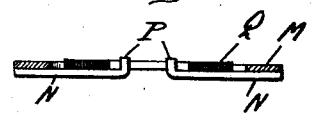
Figure 5:
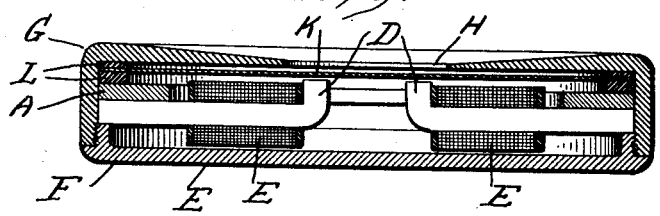
Figure 6:
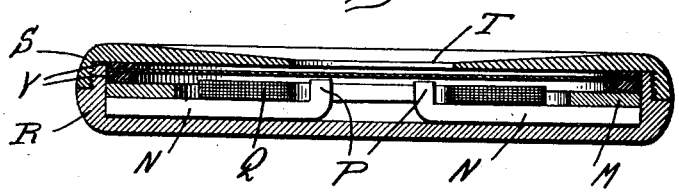

This improvement relates more particularly to earphones or telephone receivers for use in connection with telephone and radio apparatus and receiving instruments and more particularly as receiving instruments in apparatus for use of the deaf. The ordinary earphone type of telephone receiver is relatively thick and heavy and for this reason, it is objectionable, not only on account of its weight, but its thickness makes it more or less conspicuous. The object, therefore, of our improvement is to provide a thin model lightweight earphone or telephone receiver, which will be relatively inconspicuous and because of its light weight, may be worn for considerable periods of time without discomfort. A further object is to provide a thin model earphone about the size and thickness of a thin model watch and to accomplish this the pole pieces and receiving coils are arranged in a novel manner, so as to keep the pole ends and the coils substantially within the plane of the permanent ring magnet. For this purpose, our improved earphone is provided with a thin flat ring permanent magnet, formed from hardened sheet steel, to which pole pieces of soft sheet iron are secured so as to lie parallel to the faces of the magnet and extend radially from diametrically opposite points, the pole ends of the pieces being bent into the ring magnet centrally thereof. Furthermore, the pole ends are arranged so as not to extend beyond the planes defining the flat sides or opposite faces of the ring magnet. In this, our improved construction, flat magnetic coils may be placed on each pole piece or preferably for a particularly flat thin model a "pancake" type of coil is mounted upon the pole pieces and located wholly within the plane of the ring magnet and surrounding the pole ends. In the acompanying drawings, two modifications of our improvements are shown, in which Fig. 1 is a plan view of one form of the magnet with receiving coils surrounding the respective pole pieces; Fig. 2 is a side elevation and partial section of the form shown in Fig. 1; Fig. 3 is a thinner model, in which a pancake type of coil is used; Fig. 4 is a side elevation and partial section of the form shown in Fig. 3; Fig. 5 is an enlarged sectional view of the form shown in Figs. 1 and 2, enclosed in a casing; and Fig. 6 is an enlarged transverse section of the form shown in Figs. 3 and 4 encased. Referring to the drawings, it will be seen that our improved thin model earphone or telephone receiver comprises an annular flat ring permanent magnet A, preferably of hardened sheet tungsten steel, to which pole pieces B, of soft sheet iron, preferably Norway iron, are secured in any suitable manner, such as the rivets C. The pole ends D of the pole pieces are bent at right angles so as to lie within the field of the ring magnet, as indicated in Figs. 2 and 4. The pole ends D extend parallel to the axis of the flat magnet ring A and lie within the plane of the latter, as will be seen in the drawings. Each of the pole pieces B in this form is surrounded by a receiving or magnet coil E, lying axially in the field of the ring magnet. This construction provides a very compact and efficient receiver when mounted in a casing F—G, as shown in Fig. 5, the portion G of the casing being provided with the usual opening at H. A diaphragm K is mounted within the casing in position to cooperate with the pole pieces D. The diaphragm K may be supported in the casing in any suitable manner, as by means of the washers L, as shown in Fig. 5. In order to provide a particularly thin type of earphone or receiver, the form shown in Figs. 3, 4 and 6 is preferable. This comprises the thin flat permanent ring magnet M, to which pole pieces N of soft sheet iron are secured at diametrically opposite points by rivets O, the magnet M being so magnetized that the pole pieces N have the same polarity. The pole pieces N are preferably formed of thin sheet soft Norway iron and the pole ends P thereof are bent up into the plane of magnet M, as indicated in Fig. 4. The axial length of the pole ends P, as with the first form, is substantially the thickness of the magnet ring M. In this form, however, the magnetic or receiving coil Q is a single flat coil of the "pancake" type, of approximately the thickness of the magnet M, and located in the plane thereof and surrounding both pole ends P, as will be seen from Figs. 3 and 4. With this thin form, we have had very remarkable practical results with a receiver wherein the ring magnet and receiver coils are approximately one-eighth of an inch thick, as indicated in Fig. 4, and when this construction enclosed in a thin lightweight casing R—S, as shown in Fig. 6, it will be seen that a particularly desirable and attractive type of earphone is provided. In the form shown in Fig. 6, the front casing member S is provided with the usual opening T and a diaphragm U is mounted in the casing between washers V for cooperation with the pole ends P. From the above it will be seen that we provide a particularly attractive thin model type of earphone receiver which may be of particular value in apparatus for the deaf or when utilized in radio receiving sets or in connection with other apparatus where a lightweight compact earphone is of importance and desirable. The operation of our improved earphones will be readily understood from the foregoing and there is no need for an extended explanation. It will be understood that in the form shown in Figs. 1, 2 and 5, in which the receiving coils surround the pole pieces, the coils may be and preferably are mounted on the respective pole pieces before the latter are riveted to the magnet A, although it will be understood that we are not limited to any particular method or arrangement for assembling these parts. In the form shown in Figs. 3, 4 and 6, however, we have not only a more compact construction and thinner model, but it is easier and cheaper to manufacture and assemble, for the soft iron pole pieces N may be riveted to the annular flat ring magnet M and the flat pancake coil Q simply laid on the pole pieces with the pole ends P projecting therethrough, as shown in Fig. 4. It will be understood that in either of the forms shown, the enclosing casing may be made of thin stampings of aluminum or other metal, or of other material, such as molded hard rubber, and the like, arranged to hold the parts in proper relation and adapted to accentuate the thin model construction. While we do not wish to be limited, it will be understood that in order to obtain the best results from the thin model magnets, the highest quality of magnet steel is preferably used for the permanent ring magnets and the purest and best quality of soft iron for the pole pieces. Furthermore, it will be understood that while we have shown and described our preferred forms, we do not wish to be limited to the specific details of construction or to the particular method of assembly or arrangement of the parts, for obviously, these may be varied in minor details without departing from the spirit and scope of the invention. In particular, we do not wish to be limited specifically to an annular permanent magnet with soft iron pole pieces, for a substantially similar construction and arrangement may be utilized in cooperation with receiving or magnetic coils associated with soft iron pole pieces, projecting from or adapted to form a soft iron magnetic circuit; thus providing a thin flat model operating substantially as an electromagnetic telephone receiver.

We claim:—

1. A telephone receiver comprising an annular thin flat washer-like permanent magnet, flat soft iron pole pieces extending radially inward from diametrically opposite points on one face of said magnet and adapted to be of the same polarity, said pole pieces having pole ends lying symmetrically of and parallel with the axis of said magnet and located substantially entirely between opposite face planes of the magnet, and a single thin flat annular pancake receiving coil of substantially the thickness of the flat annular magnet and adapted to surround said pole ends between opposite face planes of said magnet.

2. A telephone receiver comprising an annular flat washer-like permanent magnet, a pair of thin flat soft iron pole pieces extending radially inward from one of the flat sides of the magnet and adapted to be of the same polarity, the ends of said pole pieces extending axially inward to form pole ends located between opposite face planes of said magnet, and a single thin flat annular pancake receiving coil located entirely between opposite face planes of the magnet and surrounding both of said pole ends for cooperation therewith.

3. A telephone receiver comprising an annular washer-like permanent magnet, soft iron pole pieces of thin sheet iron extending radially inward from opposite points on one of the flat faces of said magnet and adapted to be of the same polarity, the ends of said pole pieces extending inward at right angles to the plane of the magnet to form pole ends substantially central of the magnet, said pole ends lying substantially entirely within the plane of the face of said magnet, and a single thin flat annular pancake receiving coil adapted to lie flatly on said pole pieces between opposite face planes of the magnet and to surround both of said pole ends for cooperation therewith.

4. A telephone receiver comprising a thin pole pieces of the same polarity lying in the same plane radially of the magnet, pole ends on said pole pieces spaced apart and projecting axially of and within the plane of the magnet, a single annular thin flat pancake receiving coil of substantially the thickness of the washer-like magnet lying flatly upon said pole pieces and surrounding both of said pole ends for cooperation therewith, and a diaphragm of magnetic material extending parallel to said coil and adapted for cooperation with the magnet and said pole ends.

GEORGE B. FRENCH.
JESSE L. SPENCE.